US008496277B2

(12) United States Patent
Commons et al.

(10) Patent No.: US 8,496,277 B2

(45) Date of Patent: Jul. 30, 2013

(54) LATCHING SYSTEM

(75) Inventors: Josh Commons, Bellevue, ID (US); Robert Commons, Hailey, ID (US)

(73) Assignee: Sun Valley Bronze, Inc., Hailey, ID (US)

( * ) Notice: Subject to any disclaimer, the term of this patent is extended or adjusted under 35 U.S.C. 154(b) by 587 days.

(21) Appl. No.: 12/649,872

(22) Filed: Dec. 30, 2009

(65) Prior Publication Data

US 2011/0156411 A1 Jun. 30, 2011

(51) Int. Cl.

| | |
|---|---|
| ***E05B 3/00*** | (2006.01) |
| *B60R 25/02* | (2006.01) |
| *B62H 5/04* | (2006.01) |
| *E05B 13/10* | (2006.01) |
| *F16C 3/00* | (2006.01) |
| *G05G 5/00* | (2006.01) |

(52) U.S. Cl.

USPC ......... 292/336.3; 292/DIG. 46; 292/DIG. 31; 70/208

(58) Field of Classification Search

USPC ........ 292/336.3, DIG. 31, DIG. 46, 240–242; 70/208

See application file for complete search history.

(56) References Cited

U.S. PATENT DOCUMENTS

| | | | | |
|---|---|---|---|---|
| 967,377 | A | 8/1910 | Henry | |
| 1,332,193 | A * | 3/1920 | Anderson | 292/26 |
| 1,995,338 | A * | 3/1935 | Andrews | 70/489 |
| 2,131,458 | A * | 9/1938 | Turner | 292/165 |
| 2,164,150 | A * | 6/1939 | Brewster | 49/460 |
| 2,599,054 | A | 6/1952 | Gates et al. | |
| 3,259,412 | A * | 7/1966 | Wheeler | 292/113 |
| 3,869,159 | A * | 3/1975 | Eads | 292/92 |
| 4,510,779 | A * | 4/1985 | Ahad | 70/208 |
| 4,562,667 | A | 1/1986 | von Resch | |
| 4,707,006 | A * | 11/1987 | Garg et al. | 292/336.3 |
| 5,172,520 | A | 12/1992 | Hostetler et al. | |
| 5,467,623 | A | 11/1995 | Yamada et al. | |
| 5,598,664 | A | 2/1997 | Grice | |
| 5,638,709 | A * | 6/1997 | Clavin | 70/208 |
| 5,653,483 | A * | 8/1997 | Grover | 292/194 |
| 5,813,710 | A * | 9/1998 | Anderson | 292/336.3 |

(Continued)

FOREIGN PATENT DOCUMENTS

FR 2844539 A1 3/2004

OTHER PUBLICATIONS

"Marvin Windows and Doors, product website at www.marvin.com Copyright 2009,", pp. 1-6.

(Continued)

*Primary Examiner* — Thomas Beach
*Assistant Examiner* — Faria Ahmad
(74) *Attorney, Agent, or Firm* — Parsons Behle & Latimer

(57) ABSTRACT

A latching system includes a handle mechanism with a housing having a recessed channel, a handle base, and a handle member connected to the handle base. The handle base and handle member are configured to be selectably moveable relative to the housing to define an extended orientation, a first retracted orientation corresponding to an open state of the handle mechanism, and a second retracted orientation corresponding to a closed state of the handle mechanism. The handle base and handle member are further configured to be disposed in the recessed channel and extended in a first direction or a second direction. The handle member is operable for rotation about an axis of rotation to control transition between the open state and the closed state of the handle mechanism. The handle mechanism may include a panel having a lift-slide operation.

14 Claims, 3 Drawing Sheets

U.S. PATENT DOCUMENTS

| | | | | |
|---|---|---|---|---|
| 5,970,757 | A | 10/1999 | Ramsauer | |
| 6,427,501 | B2 | 8/2002 | Ramsauer | |
| 6,953,209 | B2 | 10/2005 | Jackson, Jr. et al. | |
| 7,182,374 | B2 * | 2/2007 | Figge et al. | 292/334 |
| 2004/0212198 | A1 * | 10/2004 | Glover | 292/336.3 |
| 2006/0185408 | A1 | 8/2006 | Graham et al. | |

OTHER PUBLICATIONS

"Marvin Windows and Doors, Marvin Architectural Detail Manual, Sep. 24, 2009", pp. 36A.1-16.

"Nanawall, website at www.nanawall.com/products, Feb. 24, 2010,", p. 1.

"Sliding Specialties, website at www.slidingspecialties.com/configurations, Feb. 24, 2010,", p. 1.

"Weiland Sliding Doors & Windows, website at www.weilandslidingdoors.com, Feb. 24, 2010,", p. 1.

International Search Report dated Mar. 1, 2011 from PCT/US2010/061935 filed Dec. 22, 2010.

* cited by examiner

LATCHING SYSTEM

BACKGROUND

The present disclosure relates generally to latching systems, including for panels that may be moved to cover or reveal an opening, for example, to a wall, room, or other area inside or outside of a building.

The standard residential door, which often consists of a wood flush door mounted by three hinges along one side connected to a hinge frame where the door is arranged to swing through an arc, may be the most common type of door, but many additional varieties of moveable barriers have been developed to cover or reveal one or more openings. For example, sliding doors, lift-slide doors, double doors, Dutch doors, French or casement doors, side-light doors, louver doors, bi-fold doors, screen doors, wicket doors, pocket doors, temporary walls and other partitions (and certain combinations of the foregoing) may also be used to provide ingress to and egress from a room or area, and various types of windows may also be used to close or reveal an opening. With such a variety of applications, it is desirable to provide a variety of appropriate latching systems.

For example, lift-slide doors and lift-slide windows have particular design characteristics and popular applications. Lift-slide doors and windows generally include a casement, sash or frame that defines a body of the door or window. From a closed or lowered position, this body generally can be raised relative to its surroundings and then moved side-to-side in a sliding motion. Lift-slide doors can be built to the size of entire walls which makes them popular for applications where a wall may be opened up to the outdoors to provide for "indoor-outdoor living", such as for sun-rooms, areas with swimming pools, and rooms with a view. Because lift-slide doors may be designed to be stacked flush next to side jambs or in wall pockets when they are opened, latching systems that permanently protrude from such doors may not be desirable. Latching systems that have removeable parts, which require disassembly and storage, may also not be desirable. Given the characteristics and applications of such doors and windows, it is desirable to provide appropriate latching systems.

SUMMARY

The present disclosure may be used by one of ordinary skill in the art to provide latching systems that are designed appropriately for their applications. Certain embodiments of latching systems in accordance with the present disclosure may provide one or more advantages, including in relation to their cost of manufacture, simplicity of operation, convenience, aesthetics, durability, compact design, and avoiding unwanted contact, including with other doors, walls, and passing objects and persons.

The above-mentioned drawbacks associated with existing latching systems are addressed by the embodiments of the present application, which will be understood by reading and studying the following specification.

One embodiment of the present application comprises a handle mechanism of a latching system comprising a housing having a recessed channel, a handle base and a handle member. The recessed channel of the housing extends in at least a first direction and a second direction from a lateral mid-plane of the recessed channel. The handle base and handle member are configured to be retracted into the recessed channel.

Another embodiment of the present application comprises a handle mechanism of a latching system comprising a housing having a recessed channel, a handle base and a handle member. The handle base and handle member selectably moveable relative to the housing to define an extended orientation. The handle base and the handle member are selectably moveable to define a first retracted orientation corresponding to an open state of the handle mechanism and a second retracted orientation corresponding to a closed state of the handle mechanism.

According to another embodiment of the present application, the latching system comprises a housing having a recessed channel, a handle base, a handle member and a panel. The housing is coupled to the panel. The handle base and handle member are configured to be disposed in an extended orientation and the handle member is operable for selective rotation about an axis of rotation to control transition between an open state and a closed state of the panel of the latching system.

These and other embodiments of the present application will be discussed more fully in the detailed description. The features, functions, and advantages can be achieved independently in various embodiments of the claimed invention or may be combined in yet other embodiments.

BRIEF DESCRIPTION OF FIGURES

Like reference numbers and designations in the various drawings indicate like elements.

DETAILED DESCRIPTION

In the following description, reference is made to the accompanying drawings that form a part thereof, and in which is shown by way of illustration specific exemplary embodiments of the present disclosure. These embodiments are described in sufficient detail to enable those skilled in the art to practice the teachings of the disclosure, and it is to be understood that modifications to the various disclosed embodiments may be made, and other embodiments may be utilized, without departing from the spirit and scope of the present disclosure. The following detailed description is, therefore, not to be interpreted in a limiting sense.

Figure 1:
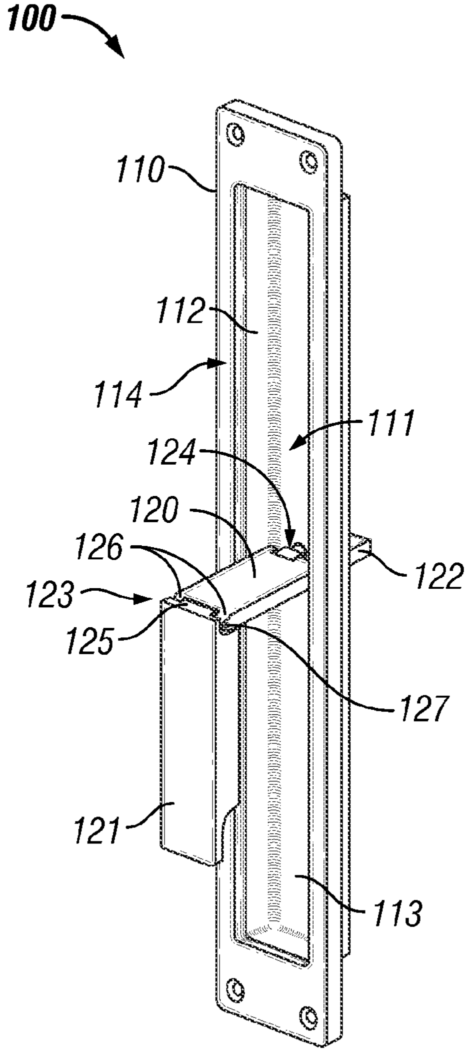
FIG. 1 is a perspective view of a handle assembly in an extended orientation.

FIG. 1 is a perspective view of a handle assembly 100 in accordance with an embodiment of the present disclosure. FIG. 1 illustrates the handle assembly 100 according to one position of operation. According to one embodiment, the handle assembly 100 comprises a housing 110, a handle base 120, a handle member 121 and a coupler 122.

In one embodiment, the housing 110 comprises a recessed channel 111, a rim 114, a handle aperture 128 (see FIG. 2), and a sleeve (not shown). As shown in FIG. 1, the recessed channel 111 is adjacent to and surrounded by the rim 114. The recessed channel 111 may be integrated with the rim 114 as one solid continuous structure. For example the recessed channel 111 and the rim 114 may be cast as a single piece. In other cases, the recessed channel 111 and the rim 114 may be manufactured independent of each other and coupled together to form an assembly to comprise the housing 110.

The recessed channel 111 of the housing 110 is configured to extend at least in a first direction and a second direction from a mid-plane of the housing 110. In one embodiment, the handle aperture 128 is defined through the recessed channel 111 at the mid-plane of the housing 110 and the sleeve is formed to extend through the handle aperture 128. Alternatively, the sleeve may be press fit or welded into the handle aperture 128. In one embodiment, the recessed channel 111 is configured having a rectangular layout and the recessed channel 111 depth is less than the width and the length. The recessed channel 111 is not limited to a rectangular layout or a depth less than a width or a length of the channel. Referring to FIG. 1, the recessed channel 111 includes a base having a face surface and four sidewalls, where the base and face surface are substantially flat and the sidewalls are substantially perpendicular to the base. In embodiments of the present disclose, at a place of union between the base and sidewalls, the place of union defines a transition configured as a chamfer or a fillet.

In other embodiments, the recessed channel 111 is configured having a square, circular, elliptical, hexagonal, figure eight shaped or other suitably shaped channel layout. Further, in other embodiments, the recessed channel 111 includes a curved or otherwise contoured base. The sidewalls of the recessed channel 111 may be oriented non-perpendicularly relative to the base of the recessed channel 111. The recessed channel 111 is configured to at least host the handle base 120 and handle member 121 in a retracted position therein.

The recessed channel 111 may further comprise a first portion 112 and a second portion 113. According to one embodiment, the recessed channel 111 comprises two symmetric halves, the first portion 112 comprising a first half and the second portion 113 comprising a second half, the two halves being symmetric about a lateral mid-plane or the handle aperture 128. In another embodiment, the first portion 112 and second portion 113 are not symmetric to each other.

According to one embodiment, the rim 114 is disposed perpendicularly to sides of the recessed channel 111 and parallel to a base of the recessed channel 111. In one embodiment, the rim 114 includes one or more apertures, the apertures being configured to receive hardware such as nails, screws, bolts or other hardware suitable for coupling the rim 114 to at least one surface of a structure such as a panel, a door or window.

Referring to FIG. 1, the handle member 121 is coupled to the handle base 120, which is coupled, in turn, to the coupler 122. As shown, the handle member 121 is an elongated body having a projected rectangular shape. In one embodiment, the handle member 121 includes, at a proximal end, a tapered end being configured to receive one or more fingers of a user's hand. The tapered end is suitable for a user to grasp and transition the handle member 121 to one or more orientations.

In one embodiment, a first joint 123 couples the handle member 121 with the handle base 120. Referring to FIG. 1, the first joint 123 comprises a first hinge link 125, a second hinge link 126, a pin 127, and a ball bearing (not shown). According to one embodiment, the first hinge link 125 is coupled to or formed as a portion of a distal end of the handle member 121. The first hinge link 125 includes a plurality of detents formed into a partially curved exterior surface of the first hinge link 125. According to one embodiment, the second hinge link 126 is coupled to or formed as a portion of a proximal end of the handle base 120. The second hinge link 126 includes a cavity extending from the proximal end towards, but terminating before, a distal end of the handle base 120. The cavity of the handle base 120 is configured to receive a bias member (not shown) for biasing the ball bearing. The ball bearing is biased by the bias member against the partially curved surface of the first hinge link 125, including one or more of the plurality of detents in order to hold the first hinge link 125 and the second hinge link 126 in a fixed selectable position.

In one embodiment, a second joint 124 couples the handle base 120 with the coupler 122. Referring to FIG. 1, the second joint 124 comprises (not shown) a third hinge link, a fourth hinge link, a pin, and a ball bearing. According to one embodiment, the third hinge link is coupled to or formed as a portion of the distal end of the handle base 120. The third hinge link includes a plurality of detents formed into a partially curved exterior surface of the third hinge link. According to one embodiment, the fourth hinge link is coupled to or formed as a portion of a proximal end of the coupler 122. The fourth hinge link includes a cavity extending from the proximal end towards, but terminating before, a distal end of the coupler 122. The cavity of the coupler 122 is configured to receive a bias member for biasing the ball bearing. The ball bearing is biased by the bias member against the partially curved surface of the third hinge link including one or more of the plurality of detents in order to hold the third hinge link and the fourth hinge link in a selectably fixed position.

In some embodiments, the coupler 122 is configured to couple with one or more latching mechanisms of a door, panel, or other body utilizing at least one latch, lock action, other securing mechanism, or transition mechanism. A transition mechanism includes one or more links for actuating, enabling or disabling motion of a panel, door or other such body.

FIG. 1 illustrates the handle assembly 100 according to one position of operation. The handle base 120 is aligned with the coupler 122, and the handle member 121 is perpendicular to the handle base 120 and coupler 122. In alternative embodiments, the angular relationship between the handle base 120, the handle member 121 and coupler 122 may vary. In operation, a user may grasp and rotate the handle member 121 causing corresponding rotation of the handle base 120 and coupler 122. In one embodiment, the handle assembly 100 is configured to rotate 180 degrees so that the coupler 122 actuates, for example, a corresponding latching mechanism through a desired range of motion. In other embodiments, the handle assembly 100 is configured to rotate through other suitable angular rotations which correspond to actuation positions of one or more latching, securing, and transitioning mechanisms.

Figure 2:
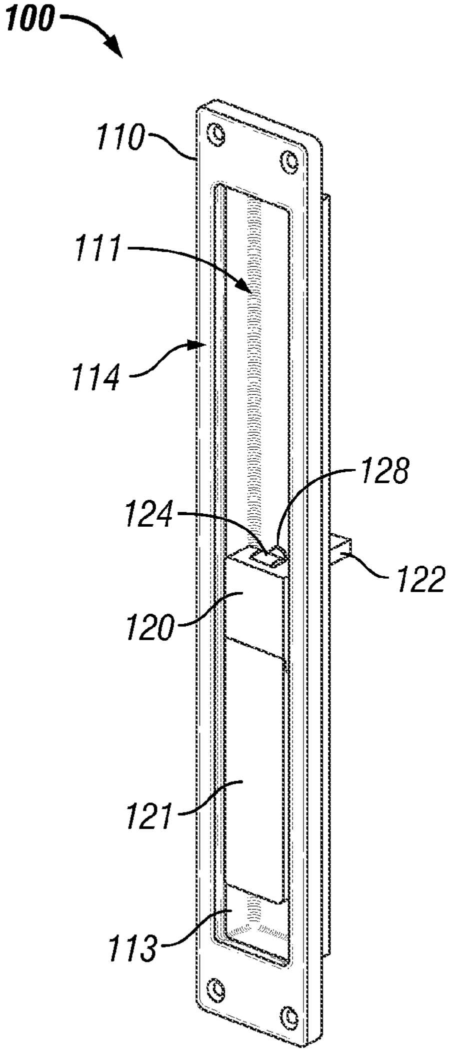
FIG. 2 is a perspective view of a handle assembly in a retracted orientation.

FIG. 2 is a perspective view of a handle assembly 100 in accordance with an embodiment of the present disclosure. FIG. 2 illustrates the handle assembly 100 according to one position of storage or retraction. An advantage of the present disclosure is the retracted position of the handle base 120 and handle member 121. As shown, the handle base 120 and handle member 121 are disposed in the second portion 113 of the recessed channel 111. In one embodiment, the handle base 120 and handle member 121 are disposed such that a top surface of each, 120 and 121, is flush with a top surface of the rim 114 of the housing 110. In an embodiment, the handle base 120 and handle member 121, while stored, do not protrude from a top plane of the recessed channel 111. Rather, the handle base 120 and the handle member 121 are configured to be selectably reconfigurable so as to fully seat into at least one portion, 113 or 114, of the recessed channel 111.

Figure 3:
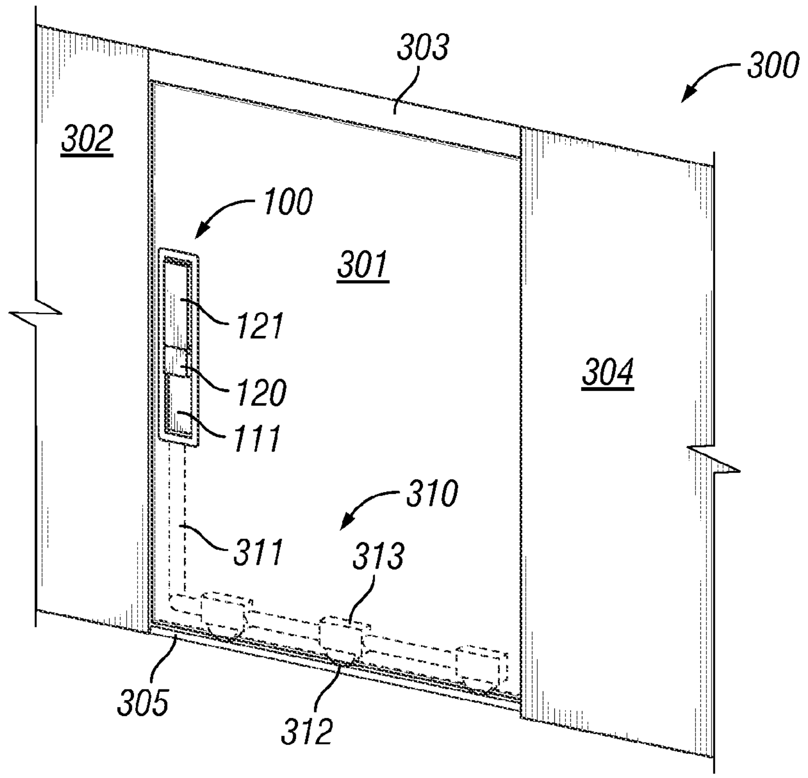
FIG. 3 is a side elevation view of a latching system incorporating a handle assembly into a panel; the panel is in a closed position and the handle assembly is in a first retracted orientation.

FIG. 3 is a side elevation view of a latching system 300 incorporating a handle assembly 100 into a panel 301 in accordance with an embodiment of the present disclosure. The panel 301 is illustrated in a closed position, and the handle assembly 100 is illustrated in a first retracted orientation. According to one embodiment, the panel 301 of the latching system 300 comprises a lift-slide type panel, an outer frame 302, a head frame 303, a pocket frame 304 and a track 305. The panel 301 is partially disposed within the head frame 303 such that the head frame 303 operates to keep the panel 301 aligned at a top portion thereof. The track 305 is configured to keep the panel 301 aligned at a lower portion thereof. The panel 301 is selectively moveable along a trajectory defined in part by the head frame 303 and track 305.

As discussed above, the handle assembly 100 comprises the handle base 120, the handle member 121 and the housing 110. In one embodiment, the housing 110 is fixedly coupled to an inside face of the panel 301. The housing 110 may be mortised flush into the inside face of the panel 301 and attached thereto by screws. In other embodiments, nails, bolts, staples, adhesives and other hardware or methods may be used to secure the housing 110 to the panel 301, including a press fit, or snap and lock hardware.

As shown, the handle base 120 and handle member 121 are aligned with each other in the first retracted orientation refracted into the first portion 112 of the recessed channel 111 of the housing 110. In the first retracted orientation, the coupler 122 of the handle assembly 100 engages a latching mechanism (not shown). The latching mechanism is disposed at least partially at an interior portion of the panel 301. In the first retracted orientation, the latching mechanism is in a secured position selectably engaged with a latch coupler 306, see FIG. 4, of the outer frame 302.

According to one embodiment, when the handle assembly 100 is in the first retracted orientation, the panel 301 engages and rests upon the track 305. In one embodiment, with the panel 301 rested on the track 305, the panel 301 is stationary and a seal exists between at least one bottom portion of the panel 301 and at least one top portion of the track 305. In one embodiment, the seal between the panel 301 and track 305 forms a barrier for air, water, debris and other matter.

In FIG. 3, the latching system 300 further comprises a bearing system 310, which is configured to be actuated to lift and enable sliding of the panel 301. The bearing system 310 comprises a bearing transition mechanism 311, a bearing element 312 and a bearing element coupler 313. The bearing system 310 facilitates the lift-slide operation of the panel 301. In an embodiment, the bearing system 310 is disposed in part in or along panel member 301 and in part in or along one or both of the head frame 303 and track 305. In the illustrated embodiment, bearing transition mechanism 311 is disposed in a side and lower edge of panel member 301, bearing element 312 is disposed along the lower edge of panel member 301, and bearing element coupler 313 is disposed in the lower portion of the panel 301.

In FIG. 3, there are three bearing elements 312 and an associated bearing element coupler 313 for each. In one embodiment, the bearing transition mechanism 311 is in communication with the coupler 122 of the handle assembly 100 (see FIG. 1), such that the coupler 122 enables actuation of the bearing transition mechanism 311. Bearing system 310 may be actuated such that bearing transition mechanism 311 lowers bearing elements 312, relative to the panel 301, into moveable engagement with the track 305 or raises bearing element 312 out of engagement with the track 305. When the bearing elements 312 are lowered, the bottom portion of the panel 301 disengages from the track 305 so that the panel 301 may be slid or rotated to another position. In the state in which the bearing elements 312 are engaged and the panel 301 is disengaged from the track 305, the handle assembly 100 is in an extended orientation as shown in FIG. 4.

Figure 4:
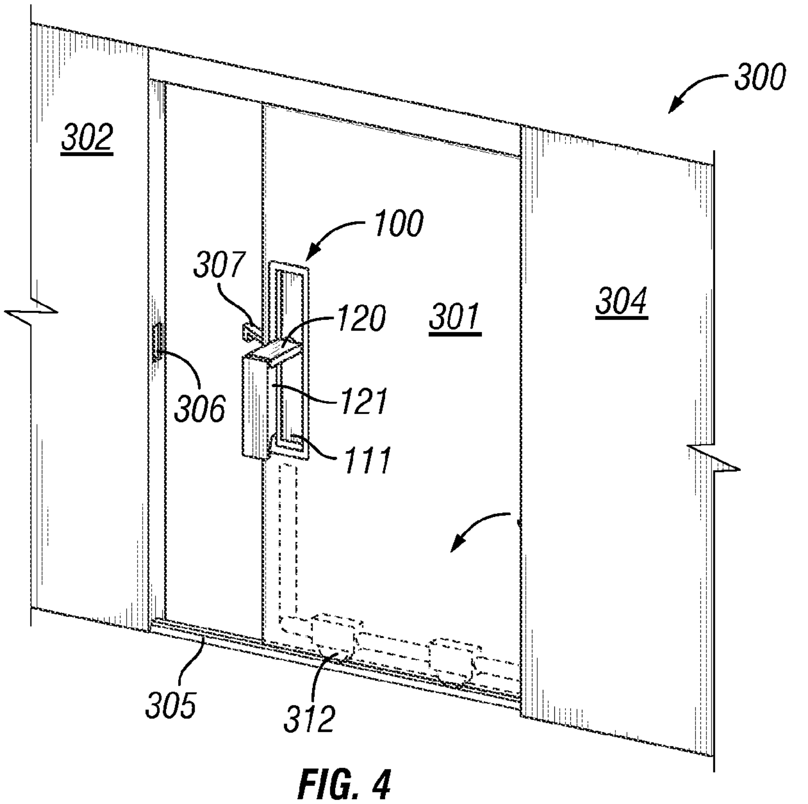
FIG. 4 is a side elevation view of a latching system incorporating a handle assembly into a panel; the panel is in a partially open position and the handle assembly is in an extended orientation.

FIG. 4 is a side elevation view of a latching system 300 incorporating a handle assembly 100 into a panel 301 in accordance with an embodiment of the present disclosure. The panel 301 is illustrated in a partially open position and the handle assembly 100 is illustrated in an extended orientation. As shown in FIG. 4, the bearing elements 312 engage the track 305, and the panel 301 is disposed above, not contacting the track 305, according to one embodiment. In the extended orientation shown in FIG. 4, the handle assembly 100 is configured so that the handle base 120 is perpendicular to the housing 111 and the handle member 121 is parallel to the housing 111 and the panel 301. In the extended orientation, the handle assembly 100 is configured as a door handle or lever suitable for a user to grasp and, as desired, actuate a latching mechanism and apply force to cause the panel 301 to traverse the track 305. As shown, the latching system 300 includes a latch member 307 configured to engage and disengage with a latch coupler 306 disposed in outer frame 302. The latch member 307 is configured to be received by and secured with the latch coupler 306.

Figure 5:
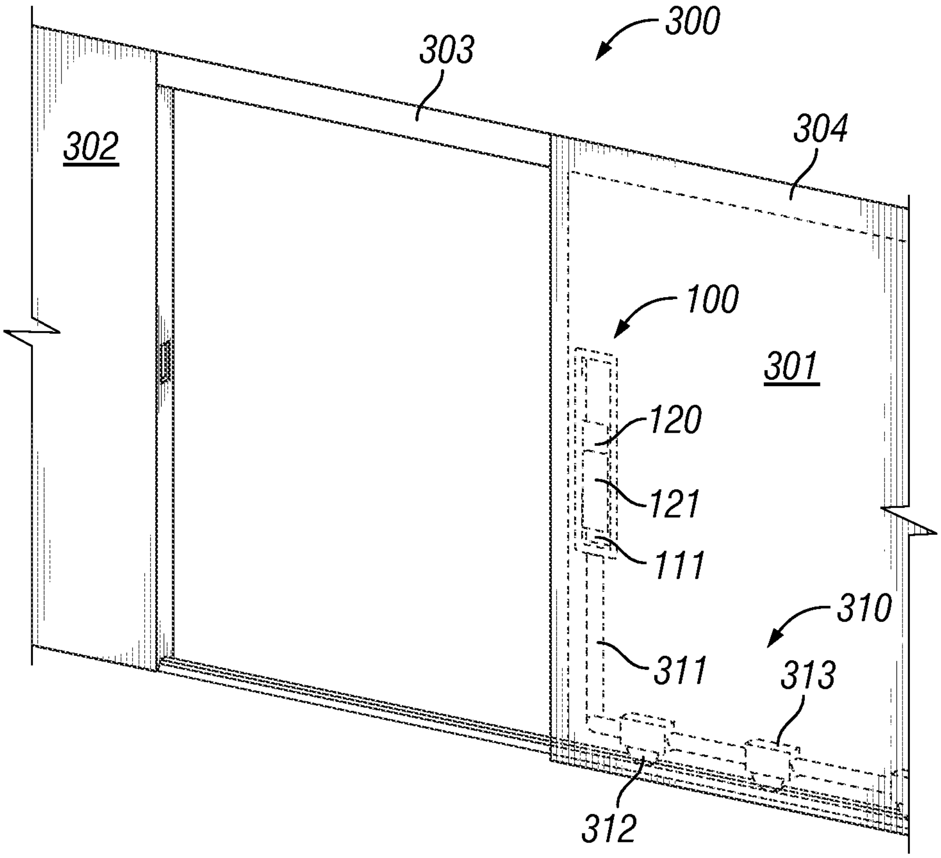
FIG. 5 is side elevation view of a latching system incorporating a handle assembly into a panel; the panel is in a fully open pocketed position and the handle assembly is in a second retracted orientation.

FIG. 5 is a side elevation view of a latching system 300 incorporating a handle assembly 100 into a panel 301 in accordance with an embodiment of the present disclosure. The panel 301 is illustrated in a fully open pocketed position, and the handle assembly 100 is illustrated in a second retracted orientation. The dotted lines in FIG. 5 illustrate that the panel 301, handle assembly 100 and bearing system 310 are disposed within the pocket frame 304. As highlighted in FIG. 5, the handle assembly 100 may advantageously be configured in a stored or retracted position such that the handle base 120 and handle member 121 are seated into the recessed channel 111, thus enabling the panel 301 to be discretely positioned inside the pocket frame 304. In one embodiment, when the handle member 121 and handle base 120 are in the position shown in FIG. 5, the latch member 307 is refracted into an interior portion of the panel 301 so that it is discretely and safely stored or pocketed in the panel 301.

As shown, in the second retracted orientation, the handle base 120 and handle member 121 are aligned with each other and are retracted into the second portion 113 of the recessed channel 111. In the second retracted orientation, the coupler 122 of the handle assembly 100 engages and transitions the latching mechanism so that the latch member 307 retracts into the panel 301. In the second retracted orientation, the coupler 122 engages and holds the bearing transition mechanism 311 in a lifted state such that the bearing elements 312 remain engaged with the track 305 and the bottom portion of the panel 301 remains disengaged from the track 305.

The features and elements of the present disclosure are not, and shall not be, limited to those disclosed and described herein. It is envisioned that the present disclosure may comprise various embodiments and combinations thereof which may be appreciated by or apparent to one of ordinary skill in the art given the benefit of the disclosure. In alternative embodiments, there may be more than one panel, each panel being selectably slidable into at least one pocket frame or into a stacked panel configuration. Further, one or more panels may be of a straight or curved construction.

The various components of the latching system 300 may comprise various suitable materials such as but not limited to, wood, metal, composite wood, metal alloy, plastic, fiberglass, glass, or any combination of the foregoing or other suitable materials.

In some embodiments, one or more tracks 305 may fasten to or seat within a flooring surface. The bearing elements 312 and the head frame 303 may be configured to enable one or more panels 301 to swing or pivot open, as opposed to sliding in a linear or curve-linear direction along a plane or path coincident with the outer frame 302 and pocket frame 304. In an alternative embodiment, there may be one or more tracks 305 mounted to the head frame 303 to further enable guidance of one or more panels 301 which may include one or more bearing components 312 coupled to a top portion thereof In another embodiment, the one or more panels 301 of the latching system 300 may be motorized such that the lifting and/or sliding motion is performed with little or no user assistance. The motorized operation may be controlled by one or both, a remote control and wall mounted controls.

In operation, the handle assembly 100 may be configured to selectably define multiple positions of extension and retraction as discussed herein. An advantage of the present disclosure is the various possible positions of the handle assembly 100.

In one embodiment, when the handle assembly 100 is in the extended orientation, the handle base 120 is not disposed flush inside the recessed channel 111 but extends at a selectable angle from the housing 110 and the handle member 121 extends at a selectable angle relative to the housing 110. The first joint 123 and second joint 124 are configured to enable the handle base 120 and handle member 121 to be selectably angled and retain positioning in a selected angle. The handle member 121 may be selectably rotated in a first arcuate direction to place the handle assembly 100 in the extended orientation. In an embodiment, when the handle assembly 100 is in the extended orientation, the latch member 307 is disengaged from the latch coupler 306 and the bearing system 310 is actuated so that the panel 301 may traverse the track 305. According to one embodiment, when the handle base 120 and handle member 121 are disposed in an extended position, the handle member 121 is operable for rotation about an axis of rotation to control transition between an open state and a closed state of the panel 301.

In another embodiment, when the handle assembly 100 is in the extended orientation, the handle base 120 is not disposed flush inside the recessed channel 111 but extends at a selectable angle from the housing 110 and the handle member 121 extends at a selectable angle relative to the housing 110. The handle member 121 may be selectably rotated in a second arcuate direction to place the handle assembly 100 in the extended orientation. In another embodiment, the handle member 121 may be selectably rotated in the first arcuate direction to place the handle assembly 100 in the extended orientation. In one embodiment, the magnitude of angular rotation of the handle member 120 defines the operation of the latching system. In another embodiment, the direction of arcuate rotation of the handle member 120 defines the function of the latching system. In one embodiment, when the handle assembly 100 is in the extended orientation the latch member 307 is disengaged from the latch coupler 306, the latch member 307 is retracted into an interior portion of the panel 301, and the bearing system 310 is in an actuated state so that the panel 301 may traverse the track 305. According to one embodiment, when the handle base 120 and handle member 121 are disposed in an extended position, the handle member 121 is operable for rotation about an axis of rotation to control transition between an open state and a closed state of the panel 301.

In an alternative embodiment, positioning the handle base 120 and handle member 121 from a first retracted position to an extended position may cause one or both of the following operations to happen: (a) the latch member 307 to disengage from the latch coupler 306, and (b) the bearing system 310 to actuate so that the panel 301 may traverse the track 305.

In an alternative embodiment, positioning the handle base 120 and handle member 121 from a second retracted position to an extended position may cause the latch member 307 to emerge from a retracted position disposed interior to the panel 301. In an embodiment, positioning the handle base 120 and handle member 121 from an extended position to the second retracted position causes the latch member 307 to retract into an interior portion of the panel 301.

The handle assembly 100 may be oriented in a primary storage position. In an embodiment, when the handle assembly 100 is in the primary storage position, the handle base 120 and handle member 121 are retracted into the recessed channel 111 so as to be flush with a top surface of the rim 114 of the housing 110. In operation, when the handle base 120 and handle member are retracted into the primary storage position (i.e., stored in the recessed channel 111), the panel 301 is able to fully retract, without interference, as a pocket door into a cavity such as the pocket frame 304. According to one embodiment, the primary storage position is defined by the handle base 120 and handle member 121 being retracted into the second portion 113 of the recessed channel 111.

In one embodiment, when the handle base 120 and handle member 121 are disposed in a first retracted orientation, the handle base 120 and handle member 121 are located in the recessed channel 111 and extended in a first direction interior to and along a face portion of the recessed channel 111.

The handle assembly 100 may be oriented in a secondary storage position. In an embodiment, when the handle assembly 100 is in the secondary storage position, the handle base 120 and handle member 121 are retracted into the recessed channel 111 so as to be flush with a top surface of the rim 114 of the housing 110. In operation, when the handle base 120 and handle member are retracted into the secondary storage position (i.e., stored in the recessed channel 111), the latch member 307 of the panel 301 is in a position configured for engagement with the latch coupler 306 of the outer frame 302. According to one embodiment, the secondary storage position is defined by the handle base 120 and handle member 121 being retracted into the first portion 112 of the recessed channel 111.

In one embodiment, when the handle base 120 and handle member 121 are disposed in a second retracted orientation, the handle base 120 and handle member 121 are located in the recessed channel 111 and extended in a second direction interior to and along a face of the recessed channel 111.

Although this disclosure has been set forth in terms of certain embodiments, other embodiments which are apparent to those of ordinary skill in the art in view of the present disclosure, including embodiments that do not provide all of the features and advantages set forth herein, are also within the scope of the claims. The scope of the present invention is defined only by reference to the appended claims and equivalents thereof

What is claimed is:

1. A handle mechanism, comprising:

a housing having a recessed channel extending in at least a first direction in a first plane and a second direction in the first plane from a lateral mid-plane of the recessed channel, a coupler connected to the housing at the lateral mid-plane, a handle base connected to the coupler at a first hinged joint, and a handle member connected to the handle base at a second hinged joint, wherein the handle base and handle member are moveable relative to the housing to define an extended orientation, a first retracted orientation corresponding to an open state of the handle mechanism and a second retracted orientation corresponding to a closed state of the handle mechanism, wherein, when the handle base and handle member are disposed in the first retracted orientation, the handle base and handle member are located in a first portion of the recessed channel and extended in the first direction, wherein, when the handle base and handle member are disposed in the second retracted orientation, the handle base and handle member are located in a second portion of the recessed channel and extended in the second direction, and wherein, when the handle base and handle member are disposed in the extended orientation, the handle member is operable for rotation about an axis of rotation to control transition between the open state and the closed state of the handle mechanism.

2. The handle mechanism of claim 1 wherein, when the handle base and handle member are disposed in the extended orientation, the handle member is parallel to a face surface of the recessed channel.

3. The handle mechanism of claim 1 wherein, when the handle base and handle member are disposed in the extended orientation, the handle base is normal to the face surface of the recessed channel.

4. The handle mechanism of claim 1, further comprising a panel member, wherein the housing is coupled to the panel member.

5. The handle mechanism of claim 4, further comprising an outer frame, wherein the panel member is configured to be selectably coupleable to the outer frame when the handle base and handle member are in the second retracted orientation corresponding to the closed state.

6. The handle mechanism of claim 4, wherein the panel member comprises a door.

7. The handle mechanism of claim 6, wherein the door is a lift-slide door.

8. The handle mechanism of claim 4, wherein the panel member comprises a window.

9. A latching system, comprising:

a housing having a recessed channel, a coupler connected to the housing, wherein the recessed channel of the housing has a first portion extending in a first direction in a first plane and a second portion extending in a second direction in the first plane from a location of connection between the housing and the coupler, a handle base connected to the coupler at a first hinged joint, and a handle member connected to the handle base at a second hinged joint, wherein the handle base and handle member are moveable relative to the housing to define at least an extended orientation in which the handle base defines an axis of rotation about which the handle member can rotate, a first retracted orientation in which the handle base and handle member are located in the first portion of the recessed channel, and a second retracted orientation in which the handle base and handle member are located in the second portion of the recessed channel.

10. The latching system of claim 9 wherein, when the handle base and handle member are disposed in the extended orientation, the handle member is parallel to the face surface of the recessed channel and is operable for rotation through an arc, at the first end of which the handle member extends in the first direction and at the second end of which the handle member extends in the second direction.

11. The latching system of claim 9 wherein the housing includes a rim, and when the handle member is disposed in the retracted orientation, the handle member is located between the face surface of the recessed channel and a plane defined by the rim.

12. The latching system of claim 9 wherein:

the housing is configured to be connectable to a panel member, when the handle member is disposed in the retracted orientation and extends in the first direction, the position of the handle member corresponds to an open state of the latching system, and when the handle member is disposed in the retracted orientation and extends in the second direction, the position of the handle member corresponds to a closed state of the latching system.

13. The latching system of claim 12 wherein, when the handle member is disposed in the extended orientation, the handle member is operable for rotation through an arc to control transition between at least the open state and the closed state of the latching system.

14. A method for operating a latching system having a housing with a recessed channel, a handle base, and a handle member connected to the handle base, the method comprising:

moving the handle base and handle member to an extended orientation, rotating the handle member in a first arcuate direction while the handle member remains parallel to a face surface of the recessed channel, moving a panel member connected to the housing in a lateral direction, rotating the handle member in a second arcuate direction, while the handle member remains parallel to the face surface of the recessed channel, and moving the handle base and handle member to a retracted orientation.

* * * * *